Figure 1:
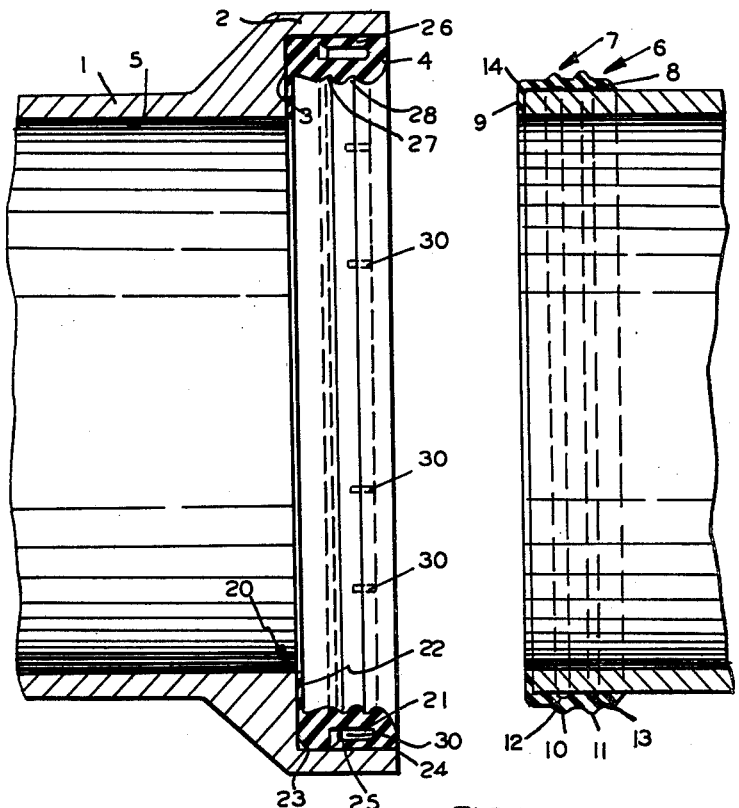

March 10, 1964 R. S. KAYNOR 3,124,367
SEAL ASSEMBLY FOR PIPE JOINT
Filed Dec. 6, 1960

INVENTOR.
RICHARD S. KAYNOR
BY
ATTORNEY

United States Patent Office 3,124,367
Patented Mar. 10, 1964

3,124,367
SEAL ASSEMBLY FOR PIPE JOINT
Richard S. Kaynor, Coral Gables, Fla. (% South Florida Plastics Inc., 1046 E. 43rd St., Hialeah, Fla.)
Filed Dec. 6, 1960, Ser. No. 74,032
5 Claims. (Cl. 277—190)

This invention relates to pipe joints and more particularly to resilient sealing rings which may be used with vitrified clay or cast iron sewer pipe of the bell and spigot type.

It has been a problem when using sewer pipe made of vitrified clay or cast iron to provide for an adequate seal between the pipe joints which can at the same time be installed economically and still compensate for the out of roundness of the pipe ends. It is well known that clay and iron pipes as delivered to the consumer are often out of round which in some instances may amount to as much as 5/16 of an inch in either the bell or spigot ends of an 8 inch diameter pipe.

Heretofore, the joints between such pipes were sealed together in the field by two separate methods. One was to pack the space between the spigot and bell portions with a calking compound. The difficulty in using a calking compound, however, is that it is difficult to install such a seal in the pipe joints after the pipe has been laid as the joints may be under water, and further, it is difficult to drive the calking in the underside of a joint since it cannot be seen. Also, it requires semi-skilled labor to drive the calking in the joint without breaking the fragile bell portion when vitrified clay pipe is used which further adds to expense of sealing the pipe joints.

A second method of sealing clay pipe is by applying resilient seals to the pipe ends while in the stockyard and before the pipe is laid in the field by pouring a molten mixture comprising a resilient material in forms around the bell and spigot ends of the pipe, allowing the mixture to cool, and then removing the forms from the pipe ends. This type of seal and method of applying it has the difficulty in that the molded portions on the ends of the pipes may often be knocked off when the pipe is shipped to the field and further it is difficult to pour the mixture comprising the resilient seal into the molds so that there is no air trapped in the seals thus causing voids in the seals when the mixture cools.

I overcome the aforementioned difficulties by providing for seals of a resilient material, such as a polyvinyl chloride, which may be extruded from an extrusion machine at high pressures or molded under pressure in an injection molding machine in order to insure that no voids exist in the seals so that they are completely non-porous. The seals themselves may be applied in the field or at the pipe factory to the pipe ends by unskilled labor. The pipe ends are then sealed together merely by forcing the spigot end of a length of pipe into the bell end of an adjacent length of pipe until the seals on each end lock together.

My present invention is an improvement of the resilient pipe joints shown and described in Patent No. 3,059,941 dated October 23, 1962. In that patent we disclose a resilient flexible pipe seal assembly which is made of an extruded or injection molded resilient material and which may be applied to the bell and spigot ends of clay pipe in the field where the pipe is being laid. Basically, the seal assembly as disclosed in that patent comprises a male sealing ring which is adapted to fit over the spigot end of the pipe and which has on the outer periphery thereof an annular locking ring and which has on one end thereof a radially extending portion which is adapted to cover the end of the spigot portion of the pipe. In addition, the seal assembly disclosed in that patent comprises a female sealing ring which is adapted to fit into the bell portion of a pipe so that the outer periphery of the ring bears on the inner periphery of the bell portion at two points with a cutout portion between the two points and in which the annular locking ring of the male sealing ring is fitted. In addition, the female sealing ring has a radially extending portion to fit against an interior radially extending shoulder of the bell portion of the pipe.

My present invention is an improvement over the seal assembly shown in the previously-mentioned patent in that I provide for an envelope portion on the exterior of the female sealing ring which is adapted to closely grip the interior periphery of the bell portion of the pipe to provide for an increased holding area so that the female sealing ring may be securely affixed inside the bell portion of the pipe. The female sealing ring still contains a portion between two bearing ridges as disclosed in the previously mentioned patent which serves as a cutout so that the wall of the seal may flex radially in order to compensate for any out of roundness of the bell portion. The cutout portion extends between the wall of the female sealing ring and the envelope portion which extends substantially longitudinally of the seal. The envelope portion is homogeneous and connected to the female sealing ring at the open end of the ring as it fits into the bell portion of the pipe.

Further I provide for the male sealing ring to have an interior annular groove which is opposite its exterior annular locking ring. The purpose of the inner annular groove is to facilitate the joining or fitting of the male sealing ring into the female sealing ring as it makes the annular locking ring more pliable allowing it to be inserted into the grooves contained in the female sealing ring with greater ease.

Also, I provide for the end of the male sealing ring, where the radially extending portion joins the wall of the ring to be tapered which further facilitates fitting of the male ring into the female ring after both rings have been secured onto the ends of the pipe.

In addition in some embodiments I provide a bearing portion in the female sealing ring which comprises a plurality of thin spaced radially extending strips joining the envelope portion with the wall portion. This structure has particular adaptability when heavy sewer pipe is used in that it provides an addition bearing surface to help support the weight of the spigot end of the pipe.

Figure 2:
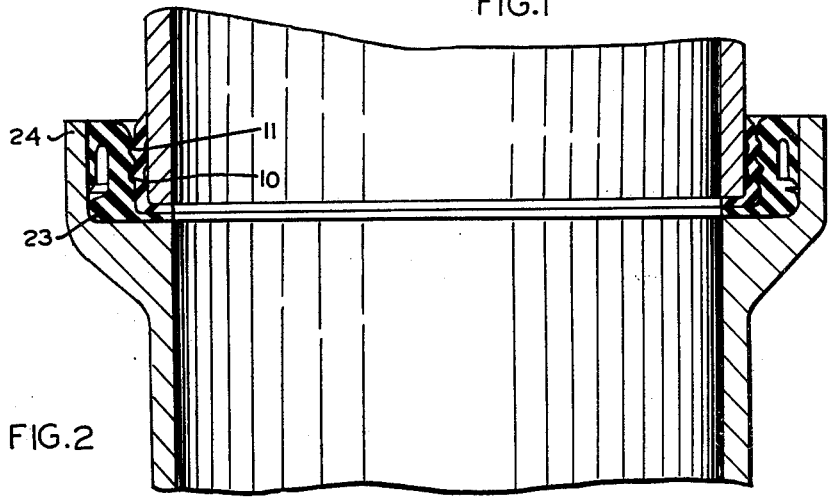

Referring to the drawings in which a preferred embodiment of my invention is shown, FIG. 1 illustrates a male and female sealing ring constructed according to my invention mounted on the spigot and bell portions of a pipe, respectively, before the pipe ends are joined; and FIG. 2 illustrates the seals as shown in FIG. 1 after the pipe ends have been joined together.

Referring to FIG. 1, 1 denotes a vitrified clay or cast iron pipe having a bell portion 2 with a radially extending shoulder 3 joining the inner wall 4 of the bell portion with the inner wall 5 of the pipe. The other end of the pipe 1 has a conventional spigot portion denoted generally by 6.

The spigot portion 6 has thereon a male sealing ring denoted generally by 7 comprising a longitudinally extending wall 8 and a radially extending portion 9 which covers the spigot end of the pipe. In addition, the ring 7 has thereon external annular locking rings 10 and 11 and inner grooves 12 and 13 which are immediately opposite the annular locking rings. The radially extending portion joins the longitudinally extending wall 8 and it is homogeneous therewith. The corner 14 joining the wall 8 and radially extending portion 9 is rounded or tapered for reasons set out below.

The bell portion of the pipe has therein a female resilient sealing ring denoted generally by 20 which comprises a longitudinally extending wall 21 and a radially extending portion 22 which covers part of the shoulder 3 of the bell of the pipe. The longitudinally extending portion of the female seal, in addition has two bearing surfaces 23 and 24 which are adapted to contact the inner wall of the bell of the pipe and which are separated by a cutout portion or void 25.

An envelope portion 26 is joined to and is homogeneous with bearing surface 24 and extends substantially longitudinally of the female sealing ring. The outer diameter of the envelope 26 is substantially the same as the inner diameter of the bell portion of the pipe in order to provide an increased holding area by which the female seal may be securely affixed inside the bell of the pipe. In addition, the female sealing ring has inner grooves 27 and 28 which are complementary in shape to locking rings 10 and 11 contained on the male seal and into which the locking rings are adapted to fit.

Both the male and female sealing rings are made of a flexible resilient material which may be extruded under high pressure from extrusion machines or molded under pressure in injection mold machines. I have found that a preferable material is polyvinyl chloride which may be formed under pressure as high as 3000 p.s.i. from extrusion machines or in injection mold machines. Such seals are free from voids caused by air bubbles and are impervious to liquid as contrasted with seals which are made by pouring molten polyvinyl chloride into open molds.

Where heavy large diameter pipe is used, it is often desirable to provide additional bearing surfaces in order to support the spigot end of the pipe in the bell end of an adjacent pipe. For this purpose, I include a plurality of spaced thin radially extending strips 30 which join the envelope portion 26 with the wall 21. The strips 30 join the inner portion of the envelope and provide additional bearing surface when the spigot end of the pipe is inserted into the bell end of an adjacent pipe. The strips 30 do not completely fill up the void 25 so that the flexibility of the wall 21 of the female sealing ring is not impaired and the ring may still conform to out-of-round pipe.

Referring to FIG. 2, it is seen that after the spigot end of a pipe has been inserted into the bell end of an adjacent pipe, the bearing surfaces 23 and 24 and strips 30 all serve to support the spigot end of the pipe inside the bell. The locking of the spigot end of the pipe into the bell end of an adjacent length of pipe is facilitated by tapering the forward edge of the male sealing ring so that the end of the pipe is easily guided into the bell.

Further locking rings 10 and 11 are made more pliable by having a cutout or annular groove on the opposite side of the wall of the seal. The spigot end may be inserted in the bell portion by rocking the spigot end back and forth and by forcing it into the bell portion until the locking rings 10 and 11 engage with the annular grooves 27 and 28. When the locking rings engage with the annular grooves, the portion 9 of the male ring will be in sealing engagement with the portion 22 of the female sealing ring.

The envelope portion 26 provides an additional sealing surface by which the female sealing ring may be affixed in the bell end of the pipe. Usually both the male ring and female ring are fixed to the ends of the pipe by using a sealant which may be applied on the outside of the spigot end of the pipe or the inside of the bell end of the pipe which serves to hold the rings on the ends of the pipe. However, it has been found that a sealant is not absolutely necessary and the seals may under ordinary conditions be retained on the pipe ends without use of a sealant or glue. If desired, the open space between the female sealing ring and interior of the bell may be filled with conventional calking compound to further insure against leakage.

Sealing rings constructed according to my invention may be easily applied in the field or at the factory to pipe ends with a minimum of effort. The pipes themselves may then be joined together simply by forcing one end into another. When the locking rings are locked into the annular grooves, which can be determined by feel, one knows that a seal has been made and it is not necessary to check or work on the bottom part of the seal below the pipe in order to insure a fluid-tight joint.

While I have shown a preferred embodiment of my invention, it is understood that the sealing rings are capable of modification and that changes in their structure may be made without departing from the scope of the invention which is expressed in the following claims.

I claim:

1. A seal assembly for a pipe joint of the bell and spigot type, comprising a resilient flexible male sealing ring adapted to fit over the spigot end of a pipe, at least one annular locking ring on the exterior of said male ring and a radially extending portion on said male ring adapted to fit over the end wall of said spigot end, a resilient flexible female sealing ring having a side wall adapted to be fitted into the bell end of a pipe, at least one inner groove in said side wall complementary in shape to said annular locking ring on said male seal, a radially extending portion connected to said side wall adapted to fit against a radially extending shoulder in the bell end of a pipe and to engage said radially extending portion on said male ring, a bearing ridge on either end of said side wall adapted to engage the inner periphery of said bell end, and an envelope portion of greater diameter than and spaced from said side wall extending along a substantial length of said side wall adapted to engage the inner periphery of the bell end of a pipe and connected to said bearing ridge located at the opposite end of said side wall from said radially extending portion; said male ring adapted to sealingly engage said female ring when placed on the end of a spigot portion of a pipe and when said pipe is forced into the bell portion of a pipe having the female sealing ring mounted therein so that each said locking ring locks into one of said inner grooves.

2. A seal assembly according to claim 1 wherein the portion of said male ring connecting with the radially extending portion is tapered.

3. A seal assembly according to claim 1 wherein said male sealing ring has an inner groove opposite each exterior annular locking ring.

4. A seal assembly according to claim 1 wherein said female ring has a plurality of spaced thin radially extending strips joining said envelope portion and said side wall.

5. A seal assembly for a pipe joint of the bell and spigot type having a circular male seal of a flexible resilient material having locking rings on its outer periphery and a circular female seal of a flexible resilient material having a side wall and having locking grooves on the inner periphery of said side wall; the improvement comprising including an envelope portion of greater diameter than and spaced from said side wall connected at one end to said side wall to provide an additional holding surface to affix said female seal in the bell end of a pipe.

References Cited in the file of this patent

UNITED STATES PATENTS

| 2,259,940 | Nathan | Oct. 21, 1941 |
| 2,280,183 | Bennet | Apr. 21, 1942 |
| 2,445,963 | Montgomery | July 27, 1948 |
| 2,451,070 | Chamberlain | Oct. 12, 1948 |
| 2,561,884 | Perrow | July 24, 1951 |
| 2,615,740 | Nathan | Oct. 28, 1952 |
| 2,809,853 | Nathan | Oct. 15, 1957 |
| 3,059,941 | Kaynor et al. | Oct. 23, 1962 |

FOREIGN PATENTS

| 217,685 | Australia | Oct. 7, 1958 |